(12) United States Patent
Maguire

(10) Patent No.: US 10,402,756 B2
(45) Date of Patent: Sep. 3, 2019

(54) CAPTURING THE RESULT OF AN APPROVAL PROCESS/WORKFLOW AND DECLARING IT A RECORD

(75) Inventor: Colin Maguire, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 2098 days.

(21) Appl. No.: 11/254,604

(22) Filed: Oct. 19, 2005

(65) Prior Publication Data

US 2007/0088585 A1   Apr. 19, 2007

(51) Int. Cl.
G06Q 10/06 (2012.01)
G06Q 10/10 (2012.01)

(52) U.S. Cl.
CPC ........... *G06Q 10/06* (2013.01); *G06Q 10/103* (2013.01)

(58) Field of Classification Search
CPC .............................. G06Q 10/06; G06Q 10/103
USPC ...................................... 705/7, 7.27
See application file for complete search history.

(56) References Cited

U.S. PATENT DOCUMENTS

| | | |
|---|---|---|
| 4,608,679 A | 8/1986 | Rudy et al. |
| 4,675,856 A | 6/1987 | Rudy et al. |
| 4,685,095 A | 8/1987 | Rudy et al. |
| 5,144,556 A | 9/1992 | Wang et al. |
| 5,710,921 A | 1/1998 | Hirose |
| RE35,861 E | 7/1998 | Queen |
| 5,813,009 A | 9/1998 | Johnson et al. |
| 5,940,804 A | 8/1999 | Turley et al. |
| 6,061,679 A | 5/2000 | Bournas et al. |
| 6,141,754 A | 10/2000 | Choy |
| 6,253,369 B1 | 6/2001 | Cloud et al. |
| 6,314,437 B1 | 11/2001 | Starek et al. |
| 6,338,074 B1 | 1/2002 | Poindexter et al. |
| 6,347,299 B1 | 2/2002 | Holzman et al. |
| 6,360,234 B2 | 3/2002 | Jain et al. |

(Continued)

FOREIGN PATENT DOCUMENTS

WO   9905632   2/1999

OTHER PUBLICATIONS

Compulink Management Center, Inc., "Laserfiche 7: Records Management Edition", revised Oct. 31, 2005, 7 pp.

(Continued)

*Primary Examiner* — Andre D Boyce
(74) *Attorney, Agent, or Firm* — Konrad Raynes Davda & Victor LLP; Janaki K. Davda

(57) ABSTRACT

Electronically capturing the result of an approval process/workflow for a record, and declaring the result as a record with a relationship to the approved record. The result of the approval process/workflow includes at least one workflow log or map. The workflow log may include the identities of those who took action during the approval process. The workflow log may also include comments of participants in the approval process and historical data about an execution instance of a workflow. The workflow map is essentially a flowchart defining the steps of the approval process and the transitions between process steps. The workflow map may specify each step, including who will process the work for the step, and the application and/or data necessary for the step. The result of the approval process/workflow for a record, including the workflow log and map, is declared as a related record along with the approved record.

22 Claims, 5 Drawing Sheets

(56) References Cited

U.S. PATENT DOCUMENTS

| | | | |
|---|---|---|---|
| 6,505,219 | B1 | 1/2003 | MacLean et al. |
| 6,553,365 | B1 | 4/2003 | Summerlin et al. |
| 6,581,069 | B1 | 6/2003 | Robinson et al. |
| 6,690,774 | B1 | 2/2004 | Chang et al. |
| 7,010,602 | B2 | 3/2006 | Poindexter et al. |
| 7,080,066 | B1 | 7/2006 | Scheurich et al. |
| 7,159,178 | B2 | 1/2007 | Vogt et al. |
| 7,213,022 | B2 | 5/2007 | Whelan et |
| 7,237,184 | B2 | 6/2007 | Ballard et al. |
| 7,321,886 | B2 | 1/2008 | Swaminathan et al. |
| 7,401,057 | B2 | 7/2008 | Eder |
| 7,428,724 | B2 * | 9/2008 | Pike et al. ............ 717/105 |
| 7,496,860 | B2 | 2/2009 | Saxena et al. |
| 8,037,029 | B2 | 10/2011 | DeBie et al. |
| 2001/0013004 | A1 | 8/2001 | Haris et al. |
| 2001/0039542 | A1 | 11/2001 | Okada et al. |
| 2002/0032689 | A1 | 3/2002 | Abbott et al. |
| 2002/0055888 | A1 * | 5/2002 | Beran et al. ............ 705/26 |
| 2002/0059466 | A1 | 5/2002 | Poindexter et al. |
| 2002/0137493 | A1 | 9/2002 | Dutta |
| 2003/0023736 | A1 | 1/2003 | Abkemeier |
| 2003/0046369 | A1 | 3/2003 | Sim et al. |
| 2003/0093458 | A1 | 5/2003 | Poindexter et al. |
| 2003/0105738 | A1 | 6/2003 | Taketa et al. |
| 2003/0135559 | A1 | 7/2003 | Bellotti et al. |
| 2003/0135565 | A1 | 7/2003 | Estrada |
| 2003/0182332 | A1 | 9/2003 | McBrearty et al. |
| 2003/0182380 | A1 | 9/2003 | Yabe et al. |
| 2003/0187878 | A1 | 10/2003 | Sandifer |
| 2003/0236788 | A1 | 12/2003 | Kanellos et al. |
| 2004/0039646 | A1 | 2/2004 | Hacker et al. |
| 2004/0054685 | A1 | 3/2004 | Rahn et al. |
| 2004/0117358 | A1 | 6/2004 | von Kaenel et al. |
| 2004/0128182 | A1 * | 7/2004 | Pepoon et al. ............ 705/9 |
| 2004/0168058 | A1 | 8/2004 | Margolus |
| 2004/0187140 | A1 | 9/2004 | Aigner et al. |
| 2004/0193740 | A1 | 9/2004 | Kasmirsky et al. |
| 2004/0230941 | A1 | 11/2004 | Marin et al. |
| 2004/0249871 | A1 | 12/2004 | Bazoon |
| 2004/0260769 | A1 | 12/2004 | Yamamoto |
| 2005/0027696 | A1 | 2/2005 | Swaminathan et al. |
| 2005/0038764 | A1 | 2/2005 | Minsky et al. |
| 2005/0044197 | A1 | 2/2005 | Lai |
| 2005/0055519 | A1 | 3/2005 | Stuart et al. |
| 2005/0076049 | A1 | 4/2005 | Qubti et al. |
| 2005/0080771 | A1 | 4/2005 | Fish |
| 2005/0097440 | A1 | 5/2005 | Lusk et al. |
| 2005/0131777 | A1 | 6/2005 | Davidson et al. |
| 2005/0149365 | A1 | 7/2005 | Johnson |
| 2005/0149908 | A1 * | 7/2005 | Klianev ............ G06F 9/5038 717/109 |
| 2005/0154723 | A1 | 7/2005 | Liang |
| 2005/0182773 | A1 | 8/2005 | Feinsmith |
| 2005/0188016 | A1 | 8/2005 | Vdaygiri et al. |
| 2005/0216448 | A1 | 9/2005 | Talib et al. |
| 2005/0222984 | A1 | 10/2005 | Radestock et al. |
| 2005/0222993 | A1 | 10/2005 | Ohtomo |
| 2005/0246276 | A1 | 11/2005 | Lee et al. |
| 2006/0004689 | A1 | 1/2006 | Chandrasekaran et al. |
| 2006/0005157 | A1 * | 1/2006 | Saxena et al. ............ 717/101 |
| 2006/0047650 | A1 | 3/2006 | Freeman et al. |
| 2006/0085245 | A1 | 4/2006 | Takatsuka et al. |
| 2006/0085374 | A1 | 4/2006 | Mayes et al. |
| 2006/0149735 | A1 | 7/2006 | DeBie et al. |
| 2006/0179061 | A1 | 8/2006 | D'Souza et al. |
| 2006/0230044 | A1 | 10/2006 | Utiger |
| 2006/0282292 | A1 | 12/2006 | Brink et al. |
| 2007/0088715 | A1 | 4/2007 | Slackman et al. |
| 2007/0088736 | A1 | 4/2007 | DeBie |
| 2007/0150445 | A1 | 6/2007 | DeBie |
| 2007/0168315 | A1 | 7/2007 | Covannon et al. |
| 2007/0192423 | A1 | 8/2007 | Karlson |
| 2007/0239715 | A1 | 10/2007 | DeBie |
| 2007/0260619 | A1 | 11/2007 | Whelan et al. |
| 2007/0271308 | A1 | 11/2007 | Bentley et al. |
| 2007/0271517 | A1 | 11/2007 | Finkelman et al. |

OTHER PUBLICATIONS

Compulink Management Center, Inc., "LaserFiche Records Management Edition Training Guide", Aug. 31, 2004, 65 pp.

Compulink Management Center, Inc., "LaserFiche Workflow Suite Reviewer's Guide", Version 5, Jun. 22, 2001, 26 pp.

Compulink Management Center, Inc., "Requirements of a Records Management Application", [online], 2004, [retrieved on Jun. 13, 2007], retrieved from the Internet at <URL: http://web.archive.org/web/055608/http://www.laserfiche.com/resources/recordsmanagerguide/requirements.html>, 6 pp.

Eddin, A.S., "How to Write to Centera Storage Appliances", [online] Oct. 25, 2007, [retrieved on Aug. 15, 2008], retrieved from the Internet at <URL: http://www.codeproject.com/KB/winsdk/CenteraStorageAppliances.aspx?display=Print>, 26 pp.

Elmasri, R. and S.B. Navathe, "Fundamentals of Database Systems", Sep. 30, 1999, 3rd Ed., Addison-Wesley, Reading, MA, 8 pp.

EMC Corp., "EMC Centera Family", [online] © 2008, [retrieved on Aug. 19, 2008], retrieved from the Internet at <URL: http://www.emc.com/products/family/emc-centera-family.htm>, 2 pp.

FileNet Corp., "Business Process Manager", © 2003, 6 pp.

FileNet Corp., "Content Manager", © 2003, 6 pp.

FileNet Corp., "FileNet Content Manager Architecture", An Architecture White Paper, Feb. 2003, 47 pp.

FileNet Corp., "FileNet Business Process Manager", Technical White Paper, Aug. 2003, 48 pp.

FileNet Corp., "FileNet P8 Workplace", © 2003, 4 pp.

International Search Report and Written Opinion, May 21, 2008, for PCT/US05/13588, 14 pp.

NetApp, "NearStore on FAS", [online] © 2008, [retrieved on Aug. 19, 2008], retrieved from the Internet at <URL: http://www.netapp.com/us/products/storage-systems/nearstore-fas/>, 1 pp.

NetApp, "SnapLock Compliance and SnapLock Enterprise Software", [online] © [retrieved on Aug. 15, 2008], retrieved from the Internet at <URL: http://www.netapp.com/us/products/protection-software/snaplock.html>, 3 pp.

SearchExpress, "Records Management Software Lets You Index, Retrieve, Distribute and Archive your Records", [online], [retrieved on Jul. 15, 2005], retrieved from the Internet at <URL: http://www.searchexpress.com/records-management.html>, 3 pp.

AIIM—The ECM Association, "FilNet Minimizes Burden of Records Management Decisions with FileNet Records Manager", [online], 2005. [Retrieved on Jan. 2, 2008]. Retrieved from the Internet at <URL: http:www.aiim.org/article-docrep.asp?ID=28516>, 5 pp.

FileNet, "FileNet Records Manager Business White Paper", [online], May 2004. Retrieved from the Internet at <URL: http://www.documentaccess.net/download/rm_whitepaper.pdf>, 13 pp.

International Preliminary Report, Mar. 5, 2009, for International Application No. PCT/US2005/013588, 10 pp.

Notification Concerning Availability of the Publication of the International Application, Apr. 2, 2009, for International Application No. PCT/US2005/013588, 1 p.

Wikipedia, "Hierarchical Storage Management", [online], [retrieved on Feb. 7, 2008]. Retrieved from the Internet at <URL: http://en.wikipedia.org/wiki/Hierarchical_storage_management>, 3 pp.

Wikipedia, "Information Lifecycle Management", [online], [retrieved on Feb. 7, 2008]. Retrieved from the Internet at <URL: http://en.wikipedia.org/wiki/Information_Lifecycle_Management>, 5 pp.

Shegda, K., "FileNet P8 Enterprise Content Management Solutions", Jun. 11, 2003 Product Report, Gartner, 13 pp.

Decision on Appeal, May 7, 2014, for U.S. Appl. No. 11/251,831, filed Oct. 18, 2005 by A.M. Takatsuka et al., Total 7 pp. [DecOnApl (70.18)].

Amendment 3, dated Feb. 26, 2009, for U.S. Appl. No. 11/255,534, filed Oct. 19, 2005 by T. DeBie, Total 12 pp. [Amend3 (70.19)].

Amendment 4, dated Aug. 13, 2009, for U.S. Appl. No. 11/255,534, filed Oct. 19, 2005 by T. DeBie, Total 16 pp. [Amend4 (70.19)].

(56) References Cited

OTHER PUBLICATIONS

Amendment 5, dated Feb. 17, 2010, for U.S. Appl. No. 11/255,534, filed Oct. 19, 2005 by T. DeBie, Total 10 pp. [Amend5 (70.19)].
Amendment 6, dated Aug. 16, 2010, for U.S. Appl. No. 11/255,534, filed Oct. 19, 2005 by T. DeBie, Total 13 pp. [Amend6 (70.19)].
Amendment 7, dated Jan. 12, 2011, for U.S. Appl. No. 11/255,534, filed Oct. 19, 2005 by T. DeBie, Total 12 pp. [Amend7 (70.19)].
Office Action 1, dated Mar. 14, 2008, for U.S. Appl. No. 11/317,712, filed Dec. 23, 2005 by T. DeBie, Total 31 pp. [OA1 (70.21)].
Final Office Action 1, dated Oct. 9, 2008, for U.S. Appl. No. 11/317,712, filed Dec. 23, 2005 by T. DeBie, Total 29 pp. [FOA1 (70.21)].
Office Action 3, dated Apr. 3, 2009, for U.S. Appl. No. 11/317,712, filed Dec. 23, 2005 by T. DeBie, Total 57 pp. [OA3 (70.21)].
Final Office Action 2, dated Oct. 5, 2009, for U.S. Appl. No. 11/317,712, filed Dec. 23, 2005 by T. DeBie, Total 57 pp. [FOA2 (70.21)].
Office Action 5, dated Feb. 25, 2010, for U.S. Appl. No. 11/317,712, filed Dec. 23, 2005 by T. DeBie, Total 47 pp. [OA5 (70.21)].
Notice of Allowance 1, dated Aug. 6, 2010, for U.S. Appl. No. 11/317,712, filed Dec. 23, 2005 by T. DeBie, Total 31 pp. [NOA1 (70.21)].
Amendment 1, dated Jun. 16, 2008, for U.S. Appl. No. 11/317,712, filed Dec. 23, 2005 by T. DeBie, Total 16 pp. [Amend1 (70.21)].
Amendment 2, dated Jan. 9, 2009, for U.S. Appl. No. 11/317,712, filed Dec. 23, 2005 by T. DeBie, Total 24 pp. [Amend2 (70.21)].
Amendment 3, dated Jul. 6, 2009, for U.S. Appl. No. 11/317,712, filed Dec. 23, 2005 by T. DeBie, Total 26 pp. [Amend3 (70.21)].
Amendment 4, dated Jan. 5, 2010, for U.S. Appl. No. 11/317,712, filed Dec. 23, 2005 by T. DeBie, Total 30 pp. [Amend4 (70.21)].
Amendment 5, dated May 25, 2010, for U.S. Appl. No. 11/317,712, filed Dec. 23, 2005 by T. DeBie, Total 23 pp. [Amend5 (70.21)].
Office Action 1, dated Mar. 3, 2008, for U.S. Appl. No. 11/401,994, filed Apr. 11, 2006 by T. DeBie, Total 17 pp. [OA1 (70.22)].
Final Office Action 1, dated Aug. 12, 2008, for U.S. Appl. No. 11/401,994, filed Apr. 11, 2006 by T. DeBie, Total 14 pp. [FOA1 (70.22)].
Notice of Allowance 1, dated Jan. 28, 2009, for U.S. Appl. No. 11/401,994, filed Apr. 11, 2006 by T. DeBie, Total 20 pp. [NOA1 (70.22)].
Notice of Allowance 2, dated Jul. 6, 2009, for U.S. Appl. No. 11/401,994, filed Apr. 11, 2006 by T. DeBie, Total 17 pp. [NOA2 (70.22)].
Amendment 1, dated Jun. 3, 2008, for U.S. Appl. No. 11/401,994, filed Apr. 11, 2006 by T. DeBie, Total 8 pp. [Amend1 (70.22)].
Amendment 2, dated Nov. 12, 2008, for U.S. Appl. No. 11/401,994, filed Apr. 11, 2006 by T. DeBie, Total 10 pp. [Amend2 (70.22)].
Amendment 3, dated Apr. 27, 2009, for U.S. Appl. No. 11/401,994, filed on Apr. 11, 2006 by T. DeBie, Total 11 pp. [Amend3 (70.22)].
Office Action 1, dated Feb. 19, 2009, for U.S. Appl. No. 11/546,542, filed Oct. 10, 2006 by T.A. DeBie et al., Total 23 pp. [OA1 (70.24)].
Final Office Action 1, dated Aug. 20, 2009, for U.S. Appl. No. 11/546,542, filed Oct. 10, 2006 by T.A. DeBie et al., Total 41 pp. [FOA1 (70.24)].
Office Action 3, dated Feb. 4, 2010, for U.S. Appl. No. 11/546,542, filed Oct. 10, 2006 by T.A. DeBie et al., Total 34 pp. [OA3 (70.24)].
Final Office Action 2, dated Aug. 9, 2010, for U.S. Appl. No. 11/546,542, filed Oct. 10, 2006 by T.A. DeBie et al., Total 37 pp. [FOA2 (70.24)].
Office Action 5, dated Dec. 30, 2010, for U.S. Appl. No. 11/546,542, filed Oct. 10, 2006 by T.A. DeBie et al., Total 30 pp. [OA5 (70.24)].
Amendment 1, dated May 19, 2009, for U.S. Appl. No. 11/546,542, filed Oct. 10, 2006 by T.A. DeBie et al., Total 18 pp. [Amend1 (70.24)].
Amendment 2, dated Nov. 20, 2009, for U.S. Appl. No. 11/546,542, filed Oct. 10, 2006 by T.A. DeBie et al., Total 18 pp. [Amend2 (70.24)].
Amendment 3, dated Jun. 4, 2010, for U.S. Appl. No. 11/546,542, filed Oct. 10, 2006 by T.A. DeBie et al., Total 19 pp. [Amend3 (70.24)].
Amendment 4, dated Nov. 9, 2010, for U.S. Appl. No. 11/546,542, filed Oct. 10, 2006 by T.A. DeBie et al., Total 23 pp. [Amend4 (70.24)].
Amendment 5, dated Mar. 30, 2011, for U.S. Appl. No. 11/546,542, filed Oct. 10, 2006 by T.A. DeBie et al., Total 7 pp. [Amend5 (70.24)].
Notice of Allowance 1, dated Jun. 2, 2011, for U.S. Appl. No. 11/546,542, filed Oct. 10, 2006 by T.A. DeBie et al., Total 22 pp. [NOA1 (70.24)].
Supplemental Notice of Allowance 2, dated Jul. 6, 2011, for U.S. Appl. No. 11/546,542, filed Oct. 10, 2006 by T.A. DeBie et al., Total 15 pp. [SuppNOA2 (70.24)].
Examiner's Answer, dated Jun. 9, 2011, for U.S. Appl. No. 11/251,831, filed Oct. 18, 2005 by A.M. Takatsuka et al., Total 24 pp. [Exmr'sAnswer (70.18)].
Appeal Brief, Apr. 27, 2011, for U.S. Appl. No. 11/251,831, filed Oct. 18, 2005 by A.M. Takatsuka et al., Total 28 pp. [AplBrf (70.18)].
Notice of Appeal, Feb. 10, 2011, for U.S. Appl. No. 11/251,831, filed Oct. 18, 2005 by A.M. Takatsuka et al., Total 1 p. [NtcofApl (70.18)].
Reply Brief, Aug. 8, 2011, for U.S. Appl. No. 11/251,831, filed Oct. 18, 2005 by A.M. Takatsuka et al., Total 17 pp. [ReplyBrf (70.18)].
Notice of Appeal, Jul. 16, 2010, for U.S. Appl. No. 10/964,694, filed Oct. 15, 2004 by L. Mayes et al., Total 1 p. [NtcApl (70.17)].
Dourish, P. W.K. Edwards, A. Lamarca, J. Lamping, K. Petersen, M. Salisbury, D.B. Terry, and J. Thornton, "Extending Document Management Systems with User-Specific Active Properties", Xerox Palo Alto Research Center, © 2000 ACM, Apr. 2000, vol. 18, No. 2, Total 31 pp.
Office Action 1, dated Jul. 20, 2006, for U.S. Appl. No. 10/834,100, filed Apr. 29, 2004 by D.S. Whelan et al., Total 18 pp. [OA1 (70.15)].
Amendment 1, dated Oct. 10, 2006, for U.S. Appl. No. 10/834,100, filed Apr. 29, 2004 by D.S. Whelan et al., Total 12 pp. [Amend1 (70.15)].
Notice of Allowance 1, dated Dec. 26, 2006, for U.S. Appl. No. 10/834,100, filed Apr. 29, 2004 by D.S. Whelan et al., Total 18 pp. [NOA1 (70.15)].
Office Action 1, dated May 14, 2008, for U.S. Appl. No. 11/363,946, filed Mar. 1, 2006 by T. DeBie et al., Total 24 pp. [OA1(70.15CIP)].
Final Office Action 1, dated Nov. 10, 2008, for U.S. Appl. No. 11/363,946, filed Mar. 1, 2006 by T. DeBie et al., Total 29 pp. [FOA1 (70.15CIP)].
Notice of Allowance 1, dated Apr. 3, 2009, for U.S. Appl. No. 11/363,946, filed Mar. 1, 2006 by T. DeBie et al., Total 28 pp. [NOA1 (70.15CIP)].
Amendment 1, dated Aug. 14, 2008, for U.S. Appl. No. 11/363,946, filed Mar. 1, 2006 by T. DeBie et al., Total 17 pp. [Amend1 (70.15CIP)].
Amendment 2, dated Feb. 10, 2009, for U.S. Appl. No. 11/363,946, filed Mar. 1, 2006 by T. DeBie et al., Total 16 pp. [Amend2 (70.15CIP)].
Office Action 1, dated Sep. 5, 2008, for U.S. Appl. No. 11/741,688, filed Apr. 27, 2007 by D.S. Whelan et al., Total 23 pp. [OA1 (70.15C1)].
Final Office Action 1, dated Jan. 21, 2009, for U.S. Appl. No. 11/741,688, filed Apr. 27, 2007 by D.S. Whelan et al., Total 24 pp. [FOA1 (70.15C1)].
Notice of Allowance 1, dated Jul. 6, 2009, for U.S. Appl. No. 11/741,688, filed Apr. 27, 2007 by D.S. Whelan et al., Total 42 pp. [NOA1 (70.15C1)].
Amendment 1, dated Dec. 5, 2008, for U.S. Appl. No. 11/741,688, filed Apr. 27, 2007 by D.S. Whelan et al., Total 9 pp. [Amend1 (70.15C1)].
Amendment 2, dated Apr. 21, 2009, for U.S. Appl. No. 11/741,688, filed Apr. 27, 2007 by D.S. Whelan et al., Total 11 pp. [Amend2 (70.15C1)].
Office Action 1, dated Jul. 18, 2007, for U.S. Appl. No. 10/964,694, filed Oct. 15, 2004 by L. Mayes et al., Total 22 pp. [OA1 (70.17)].
Final Office Action 1, dated Mar. 21, 2008, for U.S. Appl. No. 10/964,694, filed Oct. 15, 2004 by L. Mayes et al., Total 22 pp. [FOA1 (70.17)].

(56) References Cited

OTHER PUBLICATIONS

Office Action 3, dated Sep. 15, 2008, for U.S. Appl. No. 10/964,694, filed Oct. 15, 2004 by L. Mayes et al., Total 43 pp. [OA3 (70.17)].
Final Office Action 2, dated Mar. 19, 2009, for U.S. Appl. No. 10/964,694, filed Oct. 15, 2004 by L. Mayes et al., Total 38 pp. [FOA2 (70.17)].
Office Action 5, dated Sep. 8, 2009, for U.S. Appl. No. 10/964,694, filed Oct. 15, 2004 by L. Mayes et al., Total 46 pp. [OA5 (70.17)].
Final Office Action 3, dated Apr. 16, 2010, for U.S. Appl. No. 10/964,694, filed Oct. 15, 2004 by L. Mayes et al., Total 39 pp. [FOA3 (70.17)].
Preliminary Amendment, dated Mar. 3, 2006, for U.S. Appl. No. 10/964,694, filed Oct. 15, 2004 by L. Mayes et al., Total 21 pp. [PrelimAmend (70.17)].
Amendment 1, dated Dec. 18, 2007, for U.S. Appl. No. 10/964,694, filed Oct. 15, 2004 by L. Mayes et al., Total 19 pp. [Amend1 (70.17)].
Amendment 2, dated Jun. 23, 2008, for U.S. Appl. No. 10/964,694, filed Oct. 15, 2004 by L. Mayes et al., Total 15 pp. [Amend2 (70.17)].
Amendment 3, dated Dec. 15, 2008, for U.S. Appl. No. 10/964,694, filed Oct. 15, 2004 by L. Mayes et al., Total 17 pp. [Amend3 (70.17)].
Amendment 4, dated Jun. 19, 2009, for U.S. Appl. No. 10/964,694, filed Oct. 15, 2004 by L. Mayes et al., Total 25 pp. [Amend4 (70.17)].
Amendment 5, dated Jan. 7, 2010, for U.S. Appl. No. 10/964,694, filed Oct. 15, 2004 by L. Mayes et al., Total 27 pp. [Amend5 (70.17)].
Appeal Brief, Oct. 14, 2010, for U.S. Appl. No. 10/964,694, filed Oct. 15, 2004 by L. Mayes et al., Total 46 pp. [AplBrf (70.17)].
Examiner's Answer, dated Feb. 3, 2011, for U.S. Appl. No. 10/964,694, filed Oct. 15, 2004 by L. Mayes et al., Total 41 pp. [Exmr'sAnswer (70.17)].
Pre-Appeal Brief Request for Review, Jul. 16, 2010, for U.S. Appl. No. 10/964,694, filed Oct. 15, 2004 by L. Mayes et al., Total 6 pp. [Pre-AplBrf (70.17)].
Reply Brief, Mar. 31, 2011, for U.S. Appl. No. 10/964,694, filed Oct. 15, 2004 by L. Mayes et al., Total 9 pp. [ReplyBrf (70.17)].
Panel Decision, Sep. 16, 2010, for U.S. Appl. No. 10/964,694, filed Oct. 15, 2004 by L. Mayes et al., Total 2 pp. [PanelDec (70.17)].
Board Decision, Sep. 11, 2013, for U.S. Appl. No. 10/964,694, filed Oct. 15, 2004 by L. Mayes et al., Total 11 pp. [BoardDec (70.17)].
Office Action 1, dated Apr. 30, 2009, for U.S. Appl. No. 11/251,831, filed Oct. 18, 2005 by A.M. Takatsuka et al., Total 18 pp. [OA1 (70.18)].
Final Office Action 1, dated Nov. 12, 2009, for U.S. Appl. No. 11/251,831, filed Oct. 18, 2005 by A.M. Takatsuka et al., Total 36 pp. [FOA1 (70.18)].
Office Action 3, dated May 25, 2010, for U.S. Appl. No. 11/251,831, filed Oct. 18, 2005 by A.M. Takatsuka et al., Total 23 pp. [OA3 (70.18)].
Final Office Action 2, dated Nov. 12, 2010, for U.S. Appl. No. 11/251,831, filed Oct. 18, 2005 by A.M. Takatsuka et al., Total 22 pp. [FOA2 (70.18)].
Response to Office Action 1, dated Jul. 23, 2009, for U.S. Appl. No. 11/251,831, filed Oct. 18, 2005 by A.M. Takatsuka et al., Total 14 pp. [ROA1 (70.18)].
Response to Final Office Action 1, dated Feb. 12, 2010, for U.S. Appl. No. 11/251,831, filed Oct. 18, 2005 by A.M. Takatsuka et al., Total 15 pp. [RFOA1 (70.18)].
Response to Office Action 3, dated Aug. 23, 2010, for U.S. Appl. No. 11/251,831, filed Oct. 18, 2005 by A.M. Takatsuka et al., Total 16 pp. [ROA3 (70.18)].
Pre-Appeal Brief Request for Review, Feb. 10, 2011, for U.S. Appl. No. 11/251,831, filed Oct. 18, 2005 by A.M. Takatsuka et al., Total 6 pp. [Pre-AplBrf (70.18)].
Panel Decision, Mar. 29, 2011, for U.S. Appl. No. 11/251,831, filed Oct. 18, 2005 by A.M. Takatsuka et al., Total 2 pp. [PanelDec (70.18)].
Office Action 1, dated Nov. 20, 2007, for U.S. Appl. No. 11/255,534, filed Oct. 19, 2005 by T. DeBie, Total 21 pp. [OA1 (70.19)].
Final Office Action 1, dated Jul. 22, 2008, for U.S. Appl. No. 11/255,534, filed Oct. 19, 2005 by T. DeBie, Total 21 pp. [FOA1 (70.19)].
Office Action 3, dated Nov. 26, 2008, for U.S. Appl. No. 11/255,534, filed Oct. 19, 2005 by T. DeBie, Total 16 pp. [OA3 (70.19)].
Final Office Action 2, dated May 13, 2009, for U.S. Appl. No. 11/255,534, filed Oct. 19, 2005 by T. DeBie, Total 19 pp. [FOA2 (70.19)].
Office Action 5, dated May 14, 2010, for U.S. Appl. No. 11/255,534, filed Oct. 19, 2005 by T. DeBie, Total 16 pp. [OA5 (70.19)].
Final Office Action 3, dated Oct. 21, 2010, for U.S. Appl. No. 11/255,534, filed Oct. 19, 2005 by T. DeBie, Total 18 pp. [FOA3 (70.19)].
Notice of Allowance 1, dated Nov. 18, 2009, for U.S. Appl. No. 11/255,534, filed Oct. 19, 2005 by T. DeBie, Total 22 pp. [NOA1 (70.19)].
Amendment 1, dated Mar. 20, 2008, for U.S. Appl. No. 11/255,534, filed Oct. 19, 2005 by T. DeBie, Total 13 pp. [Amend1 (70.19)].
Amendment 2, dated Oct. 20, 2008, for U.S. Appl. No. 11/255,534, filed Oct. 19, 2005 by T. DeBie, Total 8 pp. [Amend2 (70.19)].
Office Action 5, dated Aug. 25, 2014, for U.S. Appl. No. 11/251,831, filed Oct. 18, 2005 by A.M. Takatsuka et al., Total 5 pp. [70.18 (OA5)].
Response to Office Action 5, dated Nov. 25, 2014, for U.S. Appl. No. 11/251,831, filed Oct. 18, 2005 by A.M. Takatsuka et al., Total 16 pp. [70.18 (ROA5)].
Final Office Action 3, dated Feb. 20, 2015, for U.S. Appl. No. 11/251,831, filed Oct. 18, 2005 by A.M. Takatsuka et al., Total 21 pp. [70.18 (FOA3)].
Response to Final Office Action 3, dated May 20, 2015, for U.S. Appl. No. 11/251,831, filed Oct. 18, 2005 by A.M. Takatsuka et al., Total 21 pp. [70.18 (RFOA3)].
Office Action 7, dated Nov. 2, 2015, for U.S. Appl. No. 11/251,831, filed Oct. 18, 2005 by A.M. Takatsuka et al., Total 19 pp. [70.18 (OA7)].
Response to Office Action 7, dated Feb. 2, 2016, for U.S. Appl. No. 11/251,831, filed Oct. 18, 2005 by A.M. Takatsuka et al., Total 17 pp. [70.18 (ROA7)].
Final Office Action 4, dated May 16, 2016, for U.S. Appl. No. 11/251,831, filed Oct. 18, 2005 by A.M. Takatsuka et al., Total 18 pp. [70.18 (FOA4)].
Response to Final Office Action 4, dated Sep. 15, 2016, for U.S. Appl. No. 11/251,831, filed Oct. 18, 2005 by A.M. Takatsuka et al., Total 18 pp. [70.18 (RFOA4)].
Office Action 9, dated Nov. 10, 2016, for U.S. Appl. No. 11/251,831, filed Oct. 18, 2005 by A.M. Takatsuka et al., Total 22 pp. [70.18 (OA9)].
Response to Office Action 9, dated Feb. 8, 2017, for U.S. Appl. No. 11/251,831, 18 pp. [70.18 (ROA9)].
Final Office Action 5, dated Apr. 28, 2017, for U.S. Appl. No. 11/251,831, 23 pp. [70.18 (FOA5)].
Response to Final Office Action 5, dated Aug. 28, 2017, for U.S. Appl. No. 11/251,831, 19 pp. [70.18 (RFOA5)].
Office Action 11, dated Nov. 9, 2017, for U.S. Appl. No. 11/251,831, filed Oct. 18, 2005, A.M. Takatsuka et al., Total 19 pp. [70.18 (OA11)].
Response to Office Action 11, dated Feb. 9, 2018, for U.S. Appl. No. 11/251,831, filed Oct. 18, 2005 by A.M. Takatsuka et al., Total 20 pp. [70.18 (ROA11)].
Response to Final Office Action for U.S. Appl. No. 11/251,831, pp. 22, dated Aug. 20, 2018, (70.20).
Final Office Action 6, dated Apr. 20, 2018, for U.S. Appl. No. 11/251,831, filed Oct. 18, 2005 by A.M. Takatsuka et al., Total 20 pp. [70.18 (FOA)].
Response to Office Action 13 for U.S. Appl. No. 11/251,831, 22 pp., dated Feb. 11, 2019 [70.18 (ROA13)].
Office Action 13 for U.S. Appl. No. 11/251,831, pp. 22, dated Nov. 9, 2018, (70.18).

(56) References Cited

OTHER PUBLICATIONS

Final Office Action 7, dated May 17, 2019, for U.S. Appl. No. 11/251,831, 26 pp. [70.18 (FOA7)].

* cited by examiner

CAPTURING THE RESULT OF AN APPROVAL PROCESS/WORKFLOW AND DECLARING IT A RECORD

CROSS-REFERENCE TO RELATED APPLICATIONS

This application is related to previously-filed U.S. non-provisional patent application entitled "Automated Records Management Based on Business Process Management", Ser. No. 10/964,694, filed on or about Oct. 15, 2004, with inventors Bao Vu and Lauren Mayes, and assigned to the same assignee as in the present application.

This application is also related to previously filed U.S. provisional patent application entitled "Team Collaboration with Business Process Management" Ser. No. 60/620,090, filed on or about Oct. 19, 2004, with inventor Allen Takatsuka, and assigned to the same assignee as in the present application.

BACKGROUND

Field

The present disclosure relates generally to records management and, more particularly, to capturing the result of an approval process or workflow and declaring the result as a record.

Description of Related Art

While electronic records management systems have many advantages over paper-based systems, electronic systems still have room for improvement. For example, with paper-based systems, related documents are often classified together with primary documents as records, not just the final version of a document. An approval process related to a record may be captured in a related document that is classified together with the primary document as a record. A number of situations may arise where, prior to creation of a record, the proposed record or other object is subjected to an approval process. For example, there may be company guidelines or laws that require the company to approve a record prior to its creation.

Several examples of records requiring approval are policy and procedure changes, capital acquisitions, and project approvals, just to name a few. A good example of a related document is the signoff or approval cover letter that accompanies a document where the document symbolizes, incorporates or includes, a policy or procedure change. Such situations may require approval of several managers or even corporate board members, and the approval process must follow a predetermined process or workflow. The cover letter indicating approval may be as important (in terms of a record) as the document itself in that it may represent compliance with company rules.

The cover letter may also be needed to show compliance with federal and/or state laws. For example, many present policies related to corporate compliance have been embodied in legislation. The Sarbanes-Oxley Act and the Health Insurance Portability and Accountability Act of 1996 are examples of such legislation. Such laws may require review and approval of items such as audit reports.

Because the approval process may be as important as the record, it may also be desirable for many companies to capture and attach the approval process meta data as part of the record. However, current electronic records management programs may not permit one to readily show the approval process for a record. Where a policy or procedure change is made, it may be desirable to show shareholder and/or board approval. Where a capital acquisition request is made, it may be desirable to show the process by which management personnel approved the acquisition. The record in the case of a capital acquisition may be a proposed check or a purchase order. Where a project approval is required, the approval may come from management, e.g., an officer, or any other authorized person.

With respect to disability claims, the object of the approval process may not be the approval of the disability claim as a record; it may be the approval related to the claim itself. It may be desirable to declare the claim as a record in addition to the approval or denial related to the claim. In this case, the approval process relates to approving or denying the claim, rather than approving or denying declaration of the claim as a record. Accordingly, the claim would be declared as a record regardless of whether the claim is approved or denied. In this manner, if the claim is approved, the insurer can show that the proper process was met for approval. This might be of interest to the insurance board members or otherwise. On the other hand, if the claim is denied, the insurer could then show that the proper procedures were met in order to defend a bad faith claim by the insured.

Current records management programs may lack protections that promote the consistent application and enforcement of records management policies. For example, some information technology systems may not be structured to support desired records management policies. Emphasis on issues such as corporate fraud has led to large-scale corporate liability and corporate failures. Greater focus is being given to corporations and their executives, as well as corporate compliance with new laws enacted as a part of this new age of corporate governance.

Moreover, process information required for audit and compliance is often not recorded. For example, it may be desirable for certain records to be created or declared by authorized persons. It may also be desirable to determine who declared or approved a document as a record. Also, it may be desirable to show the approval process related to a record, e.g., in the case of a disability claim or otherwise.

While electronic records management programs have been developed, they do not address adequately all these approval-related issues.

There is a need for a records management program that promotes the consistent application and enforcement of records management policies.

There is a need for a system that gives users greater confidence in moving from paper processes to electronic processes, ensuring them that they are following preset policies and procedures.

BRIEF SUMMARY

The present disclosure addresses the needs noted above by providing a system, computer program and method for capturing the result of an approval process or workflow and declaring the result as a record. In accordance with one embodiment of the present disclosure, a method is provided for capturing the result of an approval process or workflow and declaring it a record. The method comprises the steps of capturing the result of the approval process or workflow, the result including at least one workflow log or map, and declaring the result of the approval process or workflow as one or more records.

In yet another embodiment of the present disclosure, a computer program is provided for capturing the result of an approval process or workflow and declaring it as a record.

The computer program is embodied on computer-readable media. When executed on a computer, the computer program causes a processor to perform the steps of capturing the result of the approval process or workflow, the result including at least one workflow log or map; and declaring the result of the approval process or workflow as one or more records.

In still another embodiment of the present disclosure, a system is provided for capturing the result of an approval process or workflow and declaring it a record. The system comprises a content engine configured to capture the result of the approval process or workflow, the result including at least one workflow log or map, and a process engine configured to declare the result of the approval process or workflow as one or more records.

These, as well as other objects, features and benefits will now become clear from a review of the following detailed description of illustrative embodiments and the accompanying drawings.

DETAILED DESCRIPTION OF ILLUSTRATIVE EMBODIMENTS

The present disclosure provides a system, computer program and method for capturing the result of an approval process or workflow and declaring it a record. The declared record may be a part of—and managed by—a records management system.

In many companies that use paper-based records management systems, related documents are classified with the primary document as a record. In such companies with paper-based records management, related documents are classified together with the primary document as a record, not just the final version of a document. Approvals related to certain records may be grouped together with the record as related documents in some circumstances.

Examples include approvals related to policy and procedure changes, capital acquisitions, project approvals etc. A good example of a related document is the signoff or approval cover letter that accompanies a document showing a policy or procedure change. The company and/or certain state and/or federal laws may require that the policy or procedure not be modified without the approval of several managers. The company and/or certain state and/or federal laws may also require that the record follow a predetermined process or workflow before being approved. In such cases, the cover letter may be as important (in terms of a record) as the document itself. The process or workflow used in deciding the claim may be mandated by law, or based on legal standards.

Figure 1:
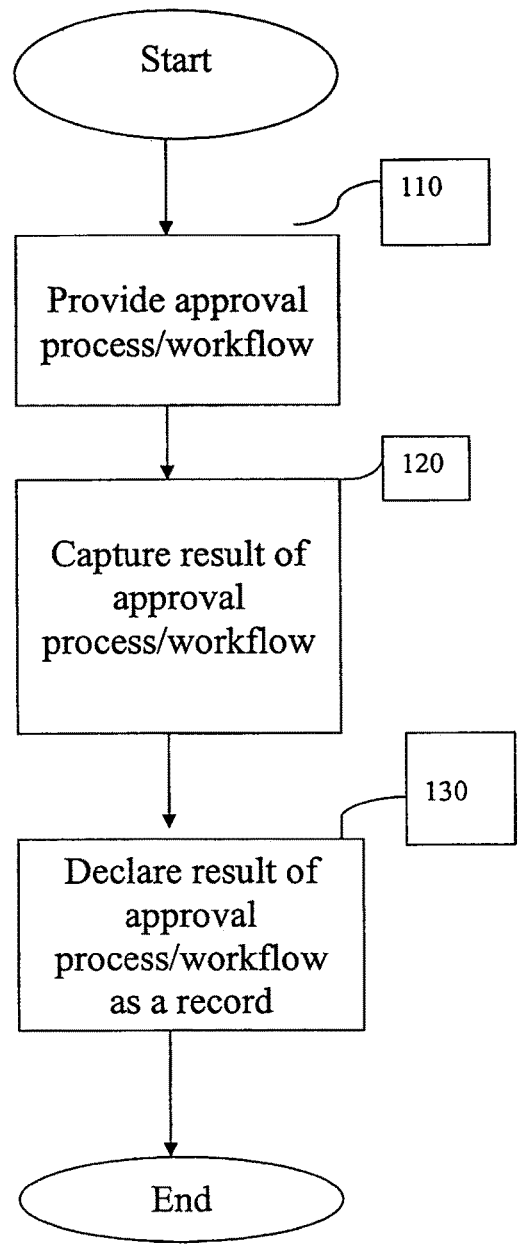
FIG. 1 is a flowchart illustration of a method for capturing an approval process and declaring it a record in accordance with one embodiment of the present disclosure.

Referring now to FIG. 1, illustrated is a flowchart 100 that shows the various steps involved in capturing the result of an approval process or workflow and declaring the result as a record. In accordance with the present disclosure, an approval process/workflow may be provided at step 110. Alternatively, the approval process/workflow may be received from an external source. In either case, the approval process or workflow may be facilitated by a workflow engine.

A workflow process or automated business process may be defined as a series of processing steps in a particular sequence, including conditional steps and branching steps, where each step could involve user input and work or automated programmatic processing. Workflow processes may be designed by system analysts and may be recorded in a process engine. In this manner, they may be executed repeatedly in the course of running a business.

In the case of an approval process or workflow, the business process may require approvals from specified or unspecified persons as set forth in greater detail hereinbelow. The approvals may relate to approving a document as a record, approving an insurance claim, approving a purchase order or any other type of process that incorporates an approval aspect.

At step 120, the result of the approval process/workflow may be captured so that a company may capture and attach the approval process meta data as part of the record. Accomplishing this feat results in a truly integrated enterprise content management solution.

Records relating to the approval process/workflow may be declared and/or archived because the present disclosure provides a single platform that integrates business process management with records management. Moreover, records related to the approval may be classified with the primary document based on a predetermined file plan. Because of the integration between business process management and records management, the system may perform various functions associated with business processes and records management seamlessly. Each of these functionalities may interoperate with one another to create a powerful business tool.

Figure 2:
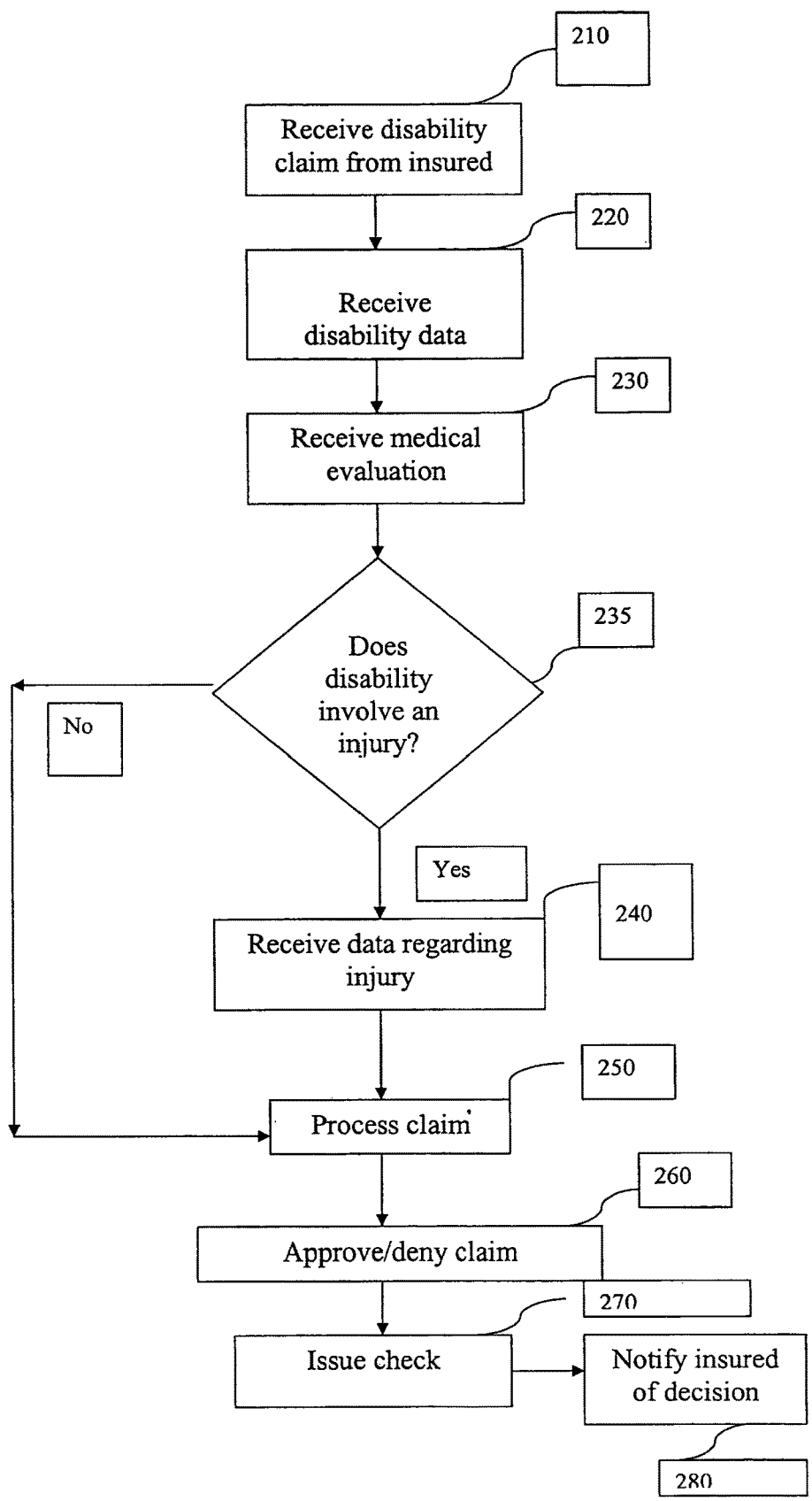
FIG. 2 is an approval process/workflow in accordance with one embodiment of the present disclosure.

Referring now to FIG. 2, illustrated is an approval process/workflow 200 in accordance with one embodiment of the present disclosure. The illustrated approval process/workflow relates to a disability insurance claim. As part of its line of business, an insurance company may approve or deny such disability claims. The approval or denial process may be performed in discrete steps and may be expressed in terms of a workflow process. At step 210, the claim process may be initiated whereby an insured makes a disability claim against his policy. As part of the claim, the insured may provide information e. g., a policy number, policy details and disability claim details. The claim may further include an estimate of the amount of money it would take to satisfy the disability claim. At a step 220, disability data may be received. At step 230, a medical evaluation may be received. In this manner, the disability data may be checked via a medical evaluation ordered by the insurance company after receiving the claim. The evaluation may be performed by the insurer, an independent medical practitioner, or by any other entity from which the insurance company desires to obtain this information. At step 235, it is determined whether the disability involves an injury. If the disability involves an injury, data related to the injury may also be obtained at step 240. At step 250, the claim is processed, then approved at step 260. In this example, the approval relates to approval of the claim which results in issuance of one or more disability checks. Accordingly, at step 270, one or more checks may be issued in the amount approved. At step 280, the insured may be notified of the decision on the claim.

The present disclosure also provides a business process management system that automates the processing of documents and events, among other things, in a business context. The business process management system may be used to automate records management as well as capturing the result of a record approval process.

The results of the approval process or workflow may be a workflow log and a map captured and/or generated during the approval process. The system captures the result of the approval process or workflow by saving the result of the approval process or workflow into a location, e.g., a content engine, and organizing this information into a logical format.

Figure 3:
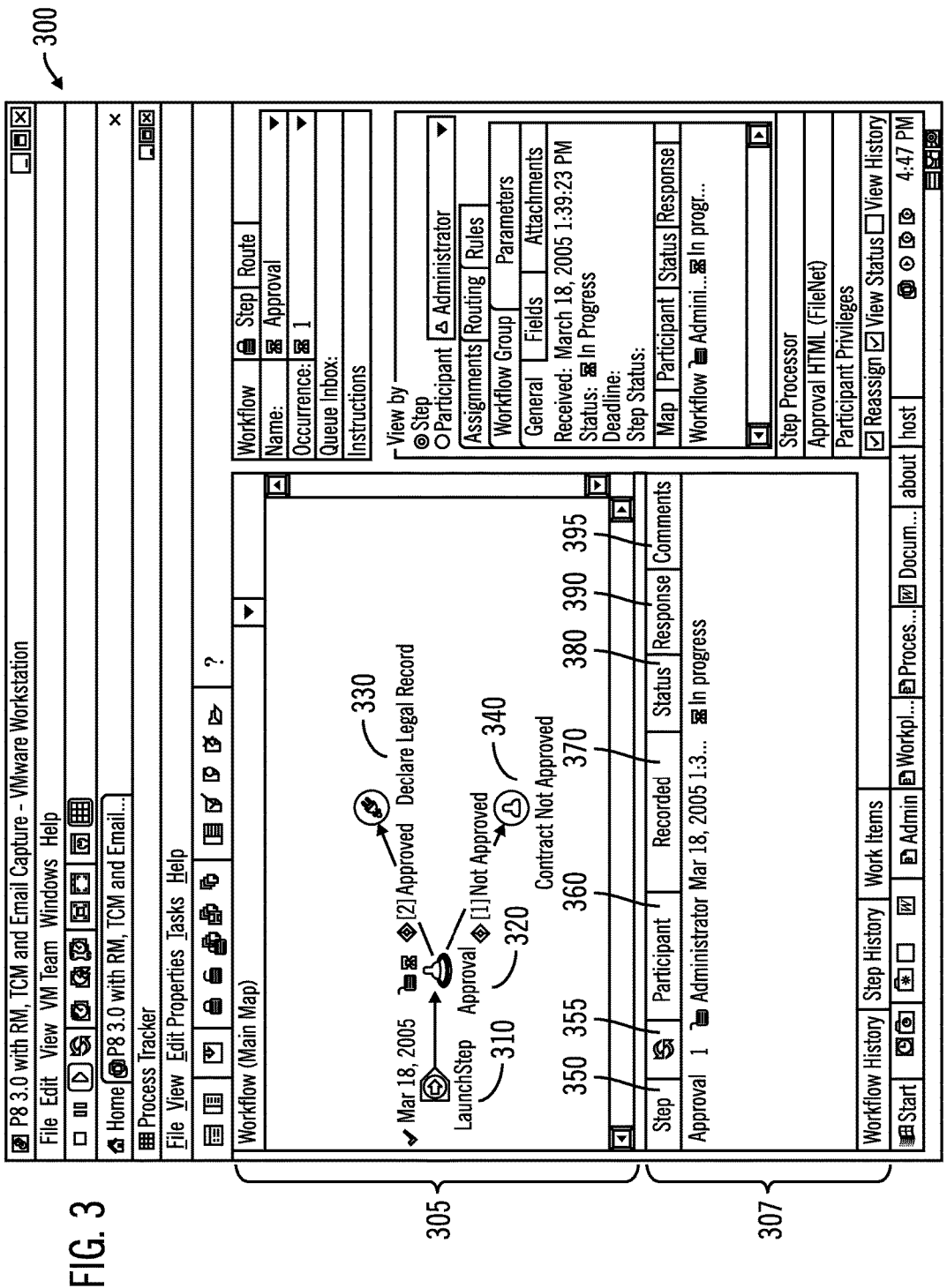
FIG. 3 is a screenshot of a workflow log and map in accordance with one embodiment of the present disclosure.

Referring now to FIG. 3, illustrated is a screenshot of a workflow log and map 300 in accordance with one embodiment of the present disclosure. This workflow log and map were created for an approval process/workflow that was designed to determine whether a contract should be declared as a legal record. The workflow map 305 is generally indicated at the upper portion of the screen, while the workflow log 307 is generally indicated at the lower portion of the screen.

A software module known as a tracker may take the workflow log and workflow definition and make a graphical representation called a workflow map, as illustrated in screenshot 300. All of the workflow fields may be logged, including any custom fields. The workflow map 305 also may include a history for each step. At step 310, the workflow map 305 may indicate an approval process or workflow has been launched. The system shows that the administrator's decision with respect to approval (or denial) of the contract as a legal record is in progress. At step 320, the system waits to receive approval of the contract as a record. If the contract is not approved as a legal record at step 320, the record is not declared at step 340. On the other hand, if the contract is approved as a legal record at step 320, then the contract is declared as a legal record at step 330.

In addition to use of this workflow 300 in connection with approving a contract as a legal record, this workflow also might be used, for example, when a policy or procedure change is being implemented by a company. The company may not wish to have the policy or procedure change declared as a legal record unless the policy or procedure change was approved by the appropriate persons. This workflow 300 might also be used for approving a purchase order for a capital acquisition. If the purchase order is not approved, then the purchase order might not be declared as a legal record.

As illustrated in FIG. 3, a workflow log may be configured to include a step identification displayed in step column 350 of workflow map 305. In the illustrative example, the only step displayed is the approval step of the workflow. The workflow log may also include the number 355 of the step in the workflow. In the present illustration, the approval step is the first execution step of the workflow, as indicated by the number "1". The workflow log also includes the identity 360 of a participant—whether by user identification or otherwise—who took action during the approval process. Here, the administrator is participating in the approval execution step of the workflow.

The workflow log may also include historical data associated with an execution step of a workflow. In the illustrated log, shown is a date and time of receipt 370 of information associated with an execution step of a workflow. The date is Mar. 18, 2005, and the time is 1:39:23 pm. The workflow log may also include the status of an execution step 380 in the workflow. Here, the administrator is in the process of implementing an approval step in the workflow. Once the administrator has implemented the approval step, the administrator's response may be indicated in column 390 as approved, not approved or otherwise.

As illustrated in FIG. 3, the workflow log may also include the comments 395, if any, each user or participant had during the approval process. A workflow log also may indicate other historical data about an execution instance of a workflow. This historical data may include the status of the execution of a step in a workflow, the time the status was reported and the response associated with the execution. The workflow log also may include information logged by the system for each step in an execution instance of a workflow, plus any user-defined information that is logged.

Using a process designer, a workflow process may be designed which writes a custom message to an event log. The custom message may be designed to display when certain system steps execute during the workflow. Custom messages may include "claim approved" or "check issued" as in the disability claim example of FIG. 2. The custom message functionality may be accessible via a log system function. The log system function may be specified by dragging a log step from a general system palette onto the workflow map where the person operating the process designer wishes to record a message in the event log. Multiple system functions may be indicated by a single step. An expression of the event type may be entered as an integer, for example, any number within a certain range, e.g., above 1000. An expression of the event may be entered as a string expression that will be recorded in the event log.

In addition to a workflow log, a workflow map may be captured as part of the result of the approval process. The workflow map may be a part of a workflow definition. A workflow definition may be a processing template that specifies the steps, resources, and routing logic needed to complete a business process. The workflow definition may include a graphical map showing the sequences of steps needed to complete a business process. The steps may represent each specific activity or task in the business process. In the context of a tracker, the workflow map may also include historical information for each step in the instance of the workflow being tracked by the tracker.

The workflow map may be, for example, essentially a flowchart defining the steps of the process and the transitions between process steps. The workflow map may include a specification of each step, including who will process the work for the step, which step processor application the participant will use, which attachments are required, what data is necessary, what responses the participant can choose, and other options. Routing logic which may form a part of the workflow definition may specify how work will advance from one step to the next.

Once the result has been captured, the result may be declared as a record. Record declaration may be performed when a potential record is added to the system. In the case of electronic content, declaration may occur when a document is created or published, or upon the creation of a new document version, or when an e-mail is transmitted.

For electronic documents as well as other types of records, the records may be automatically declared. For example, records may be declared automatically via e-mail filter programs. An e-mail manager or filter program may permit the creation of rules. These rules may provide that when an e-mail meets certain specified criteria, it is to be declared a record. Also by way of example, a look-up function may be used to declare e-mails received from certain identified persons or companies as records. When an e-mail is received from a specified user or company, the look-up system may identify the user or company as a party whose e-mails should be declared as records. A broker may set up the system so that any e-mail between the broker and customer may be declared as a record.

The records management systems, methods and computer readable media of the present disclosure are designed to manage records of various types, including but not limited to, electronic documents and e-mails, physical records or artifacts, vital records and permanent records. A record can be any asset that an organization desires to maintain and manage in a reliable manner.

An electronic record may be information recorded in a form that requires a computer or other machine to process the information. Electronic records may include e-mail messages. Physical records may be information recorded in physical form, such as a file containing paper records, videotapes, etc. Physical artifacts can include items such as museum sculptures or paintings.

Vital records may be records that are necessary for meeting operational responsibilities under organization-side emergencies. Permanent records may include those records identified as having sufficient historical or other value to warrant continued preservation by the organization beyond the time they are ordinarily needed for administrative, legal or fiscal purposes.

Records may also be generated in a variety of other uses and applications, e.g., part of a transaction, or during the course of a process.

The system may be configured such that any user can declare records by adding documents. The declaration may be made from a productivity tools suite such as MICROSOFT OFFICE.™, an email program such as MICROSOFT OUTLOOK.™, and events that automatically declare the record.

Upon declaration, the system may be designed so that the record cannot be deleted, even by the creator of the record. Access rights may be changed for a record that impacts the document's access rights.

Records may also be generated in a variety of other uses and applications, e.g., part of a transaction, or during the course of a process.

Records may be automatically declared, e.g., in connection with the insurance claim process, based on contextual information associated with an automated business process (or workflow). In the course of the automated business process in FIG. 2 hereinabove, it may be determined and recorded that this is a disability claim involving injury which has been approved. The business process management system provides for collection and recordation of this kind of information, so that it may be later used during the process. This contextual information allows the automated business process to declare the claim as a record.

It should also be understood that a separate set of records could be declared for various discrete steps. For example, a separate set of records could be declared for the issued disability checks, and these records could be maintained in a set of records of all issued checks for a certain period. Such a set of records related to issued checks might be useful for accounting, for instance.

For all processes that are related to a record, the captured result records from those processes may be associated with the original record for the lifetime of the that record. The info page of the approved record may have a link titled 'approval' which, if selected, would cause the display of information related to the approval process (what map was used, who approved it, any comments made during the approval process, etc.).

The systems, methods and computer program products described herein could also be used in conjunction with a vital record review workflow or process that is used to support regular reviews of important records. These records may relate to financials as presented by a subordinate for approval by a manager. In addition to vital record reviews, the present disclosure could be used for cutoff approvals designating the end of a retention process. Vital records review and cutoff workflows are described in greater detail in co-pending application entitled "Automated Records Management Based on Business Process Management" Ser. No. 10/964,694, filed on or about Oct. 15, 2004, with inventors Bao Vu and Lauren Mayes, and assigned to the same assignee as in the present application.

The approval process or workflow may relate to one or more primary documents, e.g., a document showing a policy or procedure change, or a disability claim application, or whatever the primary document may be. These primary documents may be classified as records in a records management system. To make the captured result of the approval process or workflow easily locatable, the captured result also may be classified as a record according to the same file plan as the primary document. One or more records that incorporate the captured result may be linked to, or otherwise associated with, the primary record. Alternatively, data that represents the captured result, e.g., a workflow log or map, may be linked to, or otherwise associated with, the declared primary record.

Classification may occur based on a classification scheme or file plan that incorporates assigned codes or categories, or any other descriptive information used to manage a record, including for purposes of the record's accessibility, retrieval, retention, disposition or any other management operations.

Contextual information collected by and associated with a business process or workflow may allow the automated business process to classify a record automatically according to a hierarchy of classifications or other classification scheme defined in the file plan. For example, for an insurance claim, a claim record classification hierarchy may include subtypes e.g., subtype accident, with a subtype below that of accident with injury, and a further subtype below that of accident with injury approved for payment. In FIG. 2, the contextual information collected in the course of the claim approval process or workflow may allow the workflow to classify the record automatically as a type of disability claim with injury that has been approved for payment. Other subtypes for insurance claims for this particular records system may be life, injury and fire. Still further subtypes may be included within these subtypes. Non-hierarchical classifications schemes may also be used.

A single person, such as a records administrator, may be charged with responsibilities for designing a classification scheme, defining a new file plan, configuring naming patterns and phases, as well as defining and modifying disposition schedules. Major categories of the file plan may be category hierarchy and disposition schedules.

Figure 4:
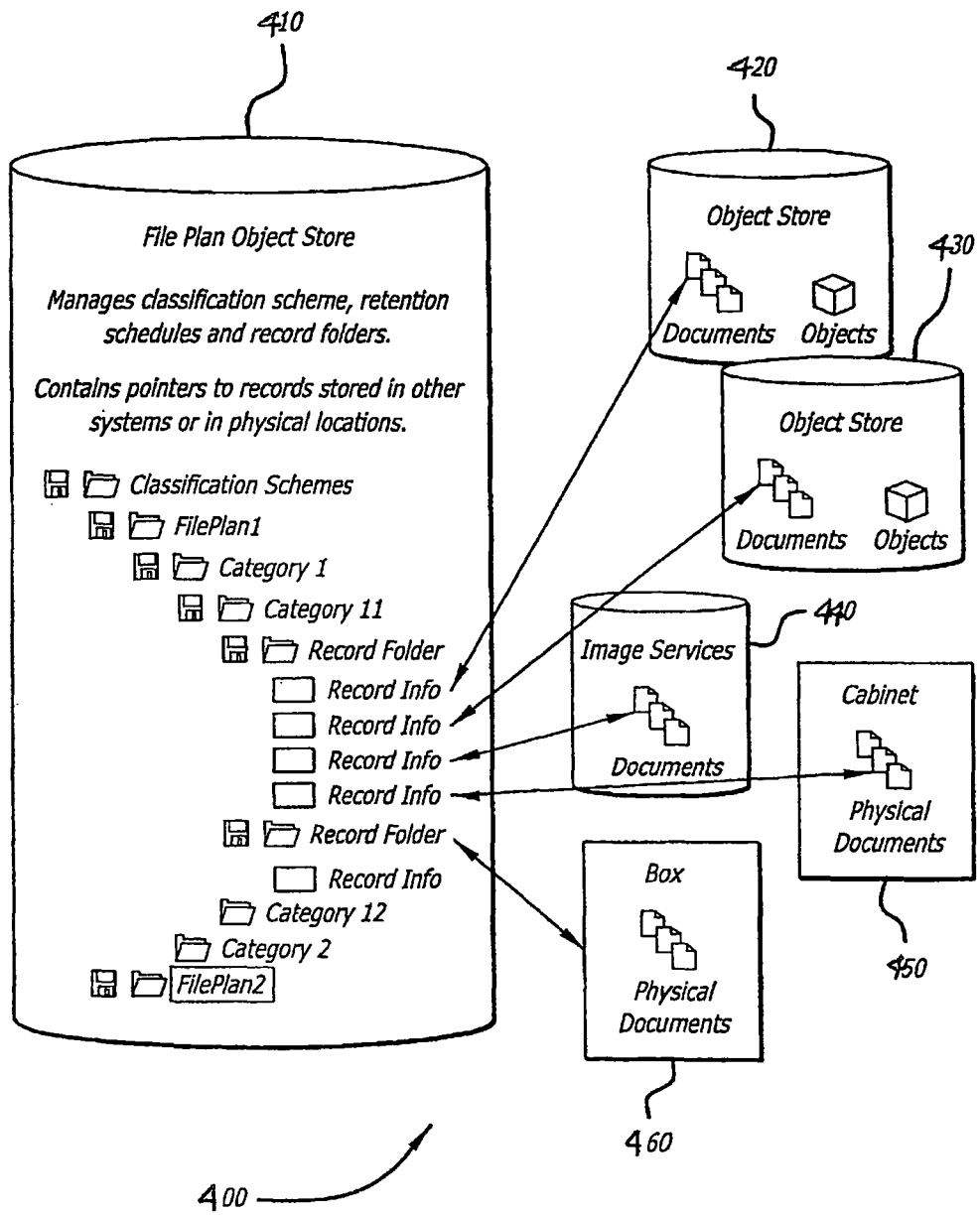
FIG. 4 is a data model 400 that can be used for a file plan in accordance with one embodiment the present disclosure.

Referring now to FIG. 4, illustrated is one embodiment of a data model 400 that can be used for a file plan in accordance with the present disclosure. In this illustration, the file plan is used to manage records across object stores and repositories. These records could include primary documents and related approval documents. As illustrated, the file plan uses a file plan object store 410 which manages classification schemes, retention schedules and record folders. The file plan object store 410 contains pointers to records stored in other systems or in physical locations. This file plan object store also incorporates a category hierarchy which may be the primary classification for records, and may include categories, as well as various types of folders and corresponding volumes. More particularly, the file plan may incorporate a classification scheme, record category, record folder, record part or record type that can be used to manage the record.

The category hierarchy may also include a tree structure defining how records are organized, and the category hierarchy may also propagate security and support disposition schedules. The category hierarchy may include a flexible hierarchical structure that is designed to fit the unique needs of an organization. The category hierarchy may determine the scheme for classifying records so that the records may be automatically classified by a records management system, without user intervention.

The category hierarchy may be determined by business function. For example, a category hierarchy may be organized according to a function/activity/transaction model wherein the first level determines functional groupings, the second level determines activities within the function, and the lowest level represents a transaction. The hierarchy may also be designed to facilitate access. In this manner, security may be more easily controlled, user access in terms of browsing may provide better performance and the hierarchy may facilitate aggregation for purposes of disposition.

Alternatively to a file plan design based on business function, a file plan may be designed so that each folder in the category is a client file that contains that particular client's records, and once the client folder is closed, cutoff may be triggered so that active use of the record ends and it begins its retention period.

As yet another alternative to file plan design based on business function, a file plan may be designed so that different types of records are filed into different folders. As yet another alternative, the file plan may be designed so that each sub-category represents a project, and each project may have a collection of folders to manage different records related to the project. An external event related to a project milestone may be used to trigger cutoff so that active use of the record ends and the retention period begins.

The record category may be added to the root of the file plan. The record category may also be added to an existing category to establish a hierarchy. The required properties of a category may be the category name which may be descriptive of the category, the category identifier which may be a more cryptic string identifier often containing a numeric code, and a reviewer which may default to the user who is adding the category.

A record folder may be added to a category. Conceptually, the record folder may be the most common level for managing records. The required properties for a folder may include the folder class such as a content engine object class defining the type of folder. The folder class may be defined by the data model. The folder properties may also include a name, identifier and reviewer much like the record category.

Generally, a record folder may not contain sub-folders, but may contain volumes. The first volume may be automatically added when the record folder is created, and a name may be automatically generated based on the folder name. When a new volume is added, the previous volume may be automatically closed. Volumes may be used to partition groups of records, whether similar or not. For example, a record folder may contain all invoices while volumes may be used to partition by month. A volume may be required to include a reviewer, which may default to the user requesting the volume.

As shown in FIG. 4, the data objects and physical repositories 420, 430, 440, 450, and 460 may be configured in conformance with the classic model of a software object that has been developed in object-oriented programming to include one or more attributes and one or more methods.

A broad variety of characteristics may be assigned as attributes to the file plan object 410, object stores 420, 430 and other objects. For example, these objects may incorporate attributes that are related to the records that are embodied in the software object such as a name for the record, a description of the record, the type of record, an identification of the holders of the record. Audit information may also be contained as an attribute relating to the record such as who accesses an object, when it is modified, who authorizes the modification, who generates documentation related to the object or repository, and when these events take place. Electronic signatures that may have been procured in connection with an object store such as object stores 410, 420, 430 may be contained as an attribute. Notifications that should be issued upon a change in an aspect of a data object, security information relating to a data object, status information that is associated with the record (such as lost item), relevant dates (e.g., creation date, expiry date, and/or key timelines, including multiple, periodic or cyclical information), and relationships between the record software object and other components may be contained as attributes.

Although each of these characteristics may be illustrated as an attribute of the object, each of these may also or instead be stored as separate components or objects in the record management system.

The data model 400 includes pointers from the file plan object store 410 to records stored in other systems or locations. One such pointer is to object stores related to documents 420, 430 which are the main record types and thus use more space. The data model also includes pointers to an image service repository 440, a cabinet repository for physical documents 450 that may be located in cabinets, as well as a box repository for physical documents 460 that may be located in boxes. This design provides for a file plan that incorporates an intuitive scheme that can be readily used by the records administrator to generate a file plan. Based on this user-friendly structure, a records administrator may customize the file plan to fit the company's needs.

Methods may be related to the records, including methods that include or relate to retention and disposition rules, timed events, notifications, reports and trends and forecasts. Each of these methods may constitute software subroutines that initiate, alter or interrupt one or more processes. As with the attributes, the methods may be stored separately from the file plan object store or data object in another object or component.

A disposition schedule may be assigned to a category or folder in the file plan. Where disposition schedules have already been configured, they may be added while adding a new container. If the hierarchy is also constructed, the disposition schedule may be added to the appropriate level after hierarchy construction. A disposition schedule may be automatically inherited by lower level entities. A disposition may also be designed to be overridden.

A disposition schedule may be associated with a record category or folder or other element of a file plan. The disposition schedule may include several elements. For example, a disposition schedule may include an event trigger that triggers cutoff. Cutoff may be the beginning of the retention period which signals the end of active use. Upon a cutoff action, a workflow may be automatically launched for approval of the cutoff. An event offset may optionally be provided as part of a disposition schedule, and may delay time between an event trigger and a cutoff. Disposition phases may be defined to control the retention of records, and each phase of disposition may have an action associated with a workflow.

The event triggers used in a file plan may be internal events, such as those related to the property of a particular category, folder, volume or record. The event trigger may also be an external event that represents an action that occurs outside the system. For example, in a doctor's office, a patient may decide to terminate his relationship and see another doctor. Such a decision may trigger a cutoff so that the patient records begin their disposition phase. A recurring event may include a start date and frequency. A recurring event may be a date for review of vital records. The event may also be a predefined date. For example, all records for a certain calendar year may be cut off at the end of a particular year.

Disposition phases may be defined within the file plan such that they include actions. Each action may have a type and an associated workflow that is launched to carry out the action. In this manner, workflows may be configured for use in a disposition schedule. Workflows may also be duplicated and modified to implement multiple actions of the same type. For example, if a business commonly transfers records on an interim basis to a particular locale, the disposition schedule may include actions related to that transfer. Disposition phase action types may include review actions, export actions, interim transfer actions, transfer actions and destroy actions. A review action may indicate that a record should be reviewed to determine if its disposition should be changed. An export action may be used to copy records to an external system without removing them. A transfer action may be used to export records to an external system so that they may be removed afterwards. A destroy action may be used to remove records so they cannot be recovered. There may be an option used to retain metadata.

A disposition schedule may be pre-configured to trigger events and phase actions. In adding a new disposition schedule, a user may be required to provide a name for a schedule, select a trigger for the schedule, define a disposition event offset, select cutoff action (option) and set disposition phases. One or more disposition phases may be added to a disposition schedule in a file plan. Phases should be in logical order. For example, a disposition schedule should be defined so that nothing follows a destruction or transfer phase. A retention period should be included for each phase. For example, a record may be reviewed one year after its cutoff, and destroyed five years after its cutoff.

Record aggregation may define the file plan level that a schedule impacts. For example, it may define which record is cutoff and then is impacted by a disposition phase.

A disposition schedule may be inherited by folders in a category or the folders may have their own disposition schedules, whether according to record types or otherwise.

Figure 5:
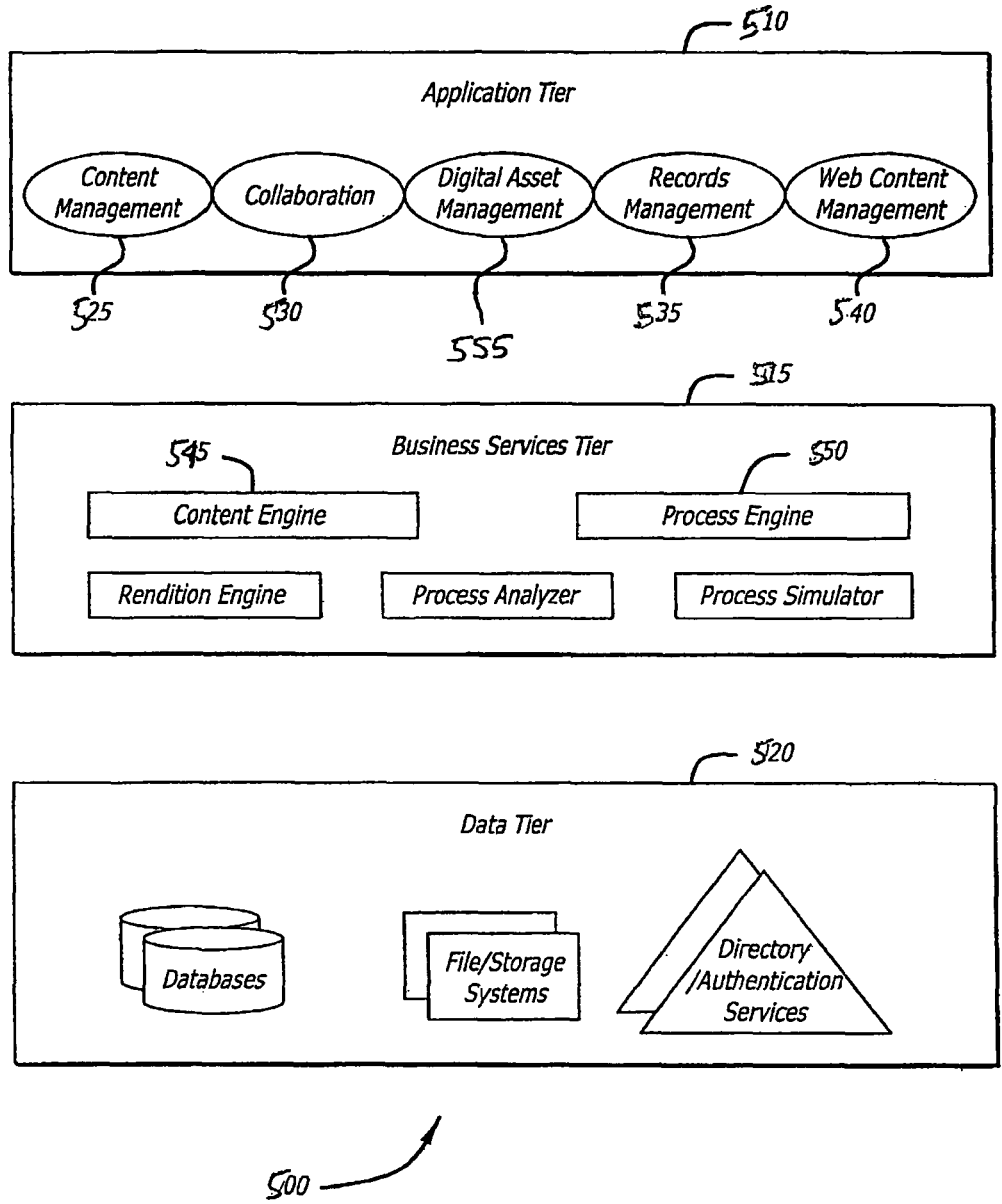
FIG. 5 is a block diagram representation of a single architecture that may be used for capturing the result of an approval process and declaring it a record in a records management system.

The present disclosure provides for capturing the result of an approval process or workflow and declaring it a record using a single architecture or platform. Referring now to FIG. 5, illustrated is a block diagram representation of a single architecture 500 that includes an application tier 510, a business services tier 515, and a data tier 520. A single architecture may be provided thereby for collaboration 530, records management 535, web content management 540, digital asset management 555 and content management 525 at the application tier, while a content engine 545 and a process engine 550 are used to manage the processes and content for all the separate systems that perform collaboration 530, records management 535, web content management 540, content management 525 and digital asset management 555. The content engine 545 and process engine 550 may be controlled by separate stand-alone servers. Alternatively, the content engine 545 and process engine 550 may be controlled by a single server, thereby resulting in a unified content and process engine.

Using this architecture, business process management may be performed such that the collaboration system 530 may be configured to initiate—automatically or otherwise— one or more processes in the process engine system 550, and vice versa. These processes may be approval processes related to records, capturing the results of these approval processes and/or declaring the result of the approval process as a record.

A process simulator 560 may be used to model business processes and simulate them under real-world conditions. By taking existing processes and simulating various scenarios based on relevant data, a business may discover how to remove bottlenecks, better align resources and reduce overall costs.

A process analyzer 570 may be used to deliver dynamic reports with historical and real-time data that enable a business to monitor and analyze processes, optimize operations and proactively address business trends. The process analyzer 570 may be based on on-line analytical processing (OLAP) technology, and it may track the performance of key business processes. The process analyzer 570 may also be used in connection with the collaborative environment.

Using the above-described architecture 500, content may also be published or declared as a record. In this manner, the records may be managed within the system, and content may be managed both inside and outside the system. For example, after a primary document is declared as a record, the system may automatically capture historical information related to one or more workflows associated with the declaration process, and declare the historical information as one or more additional records. The system may classify one or more of the records and store records associated with the approval process as records related to the primary record.

One or more of the various management applications of the application tier 410 may be a part of separate, stand-alone systems that have been brought together and integrated merely for the purpose of capturing the result of an approval process and declaring the result as a record.

Using this single architecture, logs may be taken from all systems, including the content engine, process engine, and/or the application tier. These logs may be added to the content engine, and declared as records.

In implementing approval processes related to records and declaring the results of these approval processes as records, a computer processing system may operate in conjunction with a memory system, and user interfaces to design and implement the features of the capturing the result of an approval process as well as declaring the result of the approval process as a record.

The computer processing system may be configured to perform any or all portions of the functions described in this application, as well as other functions. For example, the computer processing system may be configured to manage the various components in the system, including the various objects, processes and linking relationships that are discussed herein. The computer processing system may be configured to create, delete and modify any or all of these components.

The computer processing system may be constructed from any type of computer processing system and may include computer hardware and/or software. The computer processing system may include a general purpose computer or a computer that is dedicated to the records management system. The computer processing system may include a single computer or multiple computers and/or processors. When using multiple computers and/or processors, the multiple computers and/or processors may be at a single location or at several locations. When using multiple computers and/or processors, the multiple computers and/or processors may be interconnected by a network system, such as a local area network, a wide area network, and/or the Internet. The computer processing system may include any combination of these embodiments.

The memory system may include any type of memory system, including one or more hard disk drives, magnetic tape drives and/or RAMs. The memory system may consist of a single device or multiple devices. When multiple devices are used, they may all be at the same location or at different locations. When multiple devices are used, appropriate hardware and/or software may be used to facilitate their intercommunication.

Any one of the functions that are performed by the computer processing system may be performed in response to input from the user interface that originates with one or more users of the system that captures the result of an approval process and declares the result as a record. The user interface may include any type of user interface components, including one or more keyboards, mice and/or display screens. The user interface may include appropriate software to process information. The user interface may include communication links to other computing systems and/or databases.

The memory system may contain a plurality of record objects, data objects and other software objects. The memory may be configured to receive declaration or approval of an object as a record. Processes related to the enterprise other than capturing the result of an approval process and declaring it as a record may also be stored in the memory system.

The memory system may include a plurality of relationships or links. Each link may specify an association between two or more components in the system for capturing the result of an approval process and declaring it as a record, such as between a record object and a linked record that captures the result of an approval process. Alternatively, each link may specify an association between a record object and data that represents the captured result, e.g., a workflow log or map.

The computer processing system may be configured to allow the user operating through the user interface to create, modify and/or delete one or more of the record objects and linked approval process result records and/or links/relationships therebetween.

The memory system may include a version history which is created and managed by a version control system in the computer processing system. As changes are made to one or more of the components in the system for declaring the result of an approval process and declaring it a record, such as to one or more of the record objects, the version control system may retain information in the version history that will allow each component to be reconstructed to each of its states prior to each of the changes that are made to it. The information that is stored in the version history may include complete replicates of earlier component versions and/or merely information indicative of the changes that are made thereto.

The processing system may be used to implement the system for capturing the result of an approval process and declaring it as a record.

A security system may be employed in the computer processing system to govern who may access record objects and approval process result records that may be related to them. The security may be applied at various levels, including to groups of users and/or particular classes of information.

An audit system may be included in the computer processing system to keep an audit of accesses that are made, including accesses to the record objects and/or the results of approval processes. The audit system may keep track of who accesses a record object, when it is modified, who authorizes the modification, who generates documentation related to the record objects and approval process result records, and when these events take place. All of this information may be reported on for auditing and compliance reporting purposes.

A navigation system may be included in the computer processing system to allow a user of the collaboration system to navigate from one component of the system, such as from a record object and/or other data object, and/or to approval process result records that are related to the record object. The navigation system may include functionality that allows all links to a particular component, such as to a record object or approval process result records, to be displayed, and to allow the user to select from this display the next component with which the user wishes to work.

External management systems may be linked to the system for capturing the result of an approval process and declaring the result as a record.

The system for capturing the result of an approval process and declaring it a record may include a rules-based regulatory reporting system. Regulatory reporting controls may be used to monitor status of approval process result records and plan scheduled activities. Exception reporting may be controlled automatically by the system, once certain pre-defined criteria are not met. Business rules may be combined with automated processes to support automatic notifications and reminders.

Trends and forecasts may be reported. Using a process analyzer and simulation tools, trends and patterns in approval processes or other workflow processes may be identified and explored with what-if scenarios.

While the specification describes particular embodiments of the present invention, those of ordinary skill can devise variations of the present invention without departing from the inventive concept.

I claim:

1. A computer-implemented method comprising:
providing, with a computer processing system having a memory system, a records management system having a file plan, wherein the file plan has multiple categories in a hierarchy and is stored in an object store of a plurality of object stores, wherein a category inherits an associated disposition schedule from a higher level category, wherein the category includes one or more record folders, wherein each of the one or more record folders includes one or more records that each point to a document in another one of the plurality of object stores, and wherein the associated disposition schedule is selected from any one of review, export, and destroy; and integrating an approval process with the records management system by:
  determining that a first record for a primary document that is subject to the approval process is to be stored based on contextual information collected by the approval process;
  storing the first record for the primary document in a record folder of the category, wherein the category is selected based on the contextual information collected by the approval process;
  storing a second record for a result of the approval process in the record folder of the category;
  storing a third record for historical information related to the approval process in the record folder of the category; and
  in response to determining that a disposition of the first record is to destroy, removing the first record, the second record, and the third record from the record folder of the category.

2. The computer-implemented method of claim 1, wherein a workflow log of the result includes an identity of each participant in the approval process.

3. The computer-implemented method of claim 1, wherein a workflow log of the result includes comments from each participant in the approval process.

4. The computer-implemented method of claim 1, wherein a workflow log of the result includes information regarding execution of a step in the approval process.

5. The computer-implemented method of claim 4, wherein the information regarding execution of the step in the approval process includes at least one of a date and a time of completion of the execution of the step in the approval process.

6. The computer-implemented method of claim 1, further comprising:
  linking the second record for the result of the approval process with the first record for the primary document.

7. The computer-implemented method of claim 1, wherein a map of the result includes steps and a history for each of the steps, and wherein a workflow log of the result identifies at least one of the steps in the map and provides additional information for the identified at least one of the steps.

8. Computer-readable media containing a computer program, wherein the computer-readable media is not a signal, and wherein the computer program, when executed on a computer, causes a processor to perform:
  providing a records management system having a file plan, wherein the file plan has multiple categories in a hierarchy and is stored in an object store of a plurality of object stores, wherein a category inherits an associated disposition schedule from a higher level category, wherein the category includes one or more record folders, wherein each of the one or more record folders includes one or more records that each point to a document in another one of the plurality of object stores, and wherein the associated disposition schedule is selected from any one of review, export, and destroy; and
  integrating an approval process with the records management system by:
    determining that a first record for a primary document that is subject to the approval process is to be stored based on contextual information collected by the approval process;
    storing the first record for the primary document in a record folder of the category, wherein the category is selected based on the contextual information collected by the approval process;
    storing a second record for a result of the approval process in the record folder of the category
    storing a third record for historical information related to the approval process in the record folder of the category; and
    in response to determining that a disposition of the first record is to destroy, removing the first record, the second record, and the third record from the record folder of the category.

9. The computer-readable media of claim 8, wherein a workflow log of the result includes an identity of each participant in the approval process.

10. The computer-readable media of claim 8, wherein a workflow log of the result includes comments from each participant in the approval process.

11. The computer-readable media of claim 8, wherein a workflow log of the result includes information regarding execution of a step in the approval process.

12. The computer-readable media of claim 11, wherein the information regarding execution of the step in the approval process includes at least one of a date and a time of completion of the execution of the step in the approval process.

13. The computer-readable media of claim 8, wherein the computer program, when executed on the computer, causes the processor to perform:
  linking the second record for the result of the approval process with the first record for the primary document.

14. The computer-readable media of claim 8, wherein a map of the result includes steps and a history for each of the steps, and wherein a workflow log of the result identifies at least one of the steps in the map and provides additional information for the identified at least one of the steps.

15. A system the system comprising:
  a processor; and
  a computer readable media storing a computer program, wherein the processor executes the computer program to perform:
  providing a records management system having a file plan, wherein the file plan has multiple categories in a hierarchy and is stored in an object store of a plurality of object stores, wherein a category inherits an associated disposition schedule from a higher level category, wherein the category includes one or more record folders, wherein each of the one or more record folders includes one or more records that each point to a document in another one of the plurality of object stores, and wherein the associated disposition schedule is selected from any one of review, export, and destroy; and
  integrating an approval process with the records management system by:
    determining that a first record for a primary document that is subject to the approval process is to be stored based on contextual information collected by the approval process;
    storing the first record for the primary document in a record folder of the category, wherein the category is selected based on the contextual information collected by the approval process;
    storing a second record for a result of the approval process in the record folder of the category;
    storing a third record for historical information related to the approval process in the record folder of the category; and in response to determining that a disposition is to destroy, removing the first record, the second record, and the third record from the record folder of the category.

16. The system of claim 15, wherein a workflow log of the result includes an identity of each participant in the approval process.

17. The system of claim 16, wherein a workflow log of the result includes comments from each participant in the approval process.

18. The system of claim 15, wherein a workflow log of the result includes information regarding execution of a step in the approval process.

19. The system of claim 18, wherein the information regarding execution of the step in the approval process includes at least one of a date and a time of completion of the execution of the step in the approval process.

20. The system of claim 19, further comprising:
a link subsystem configured to link the second record for the result of the approval process with the first record for the primary document.

21. The system of claim 15, wherein a content engine and a process engine are controlled by a single server.

22. The system of claim 15, wherein a map of the result includes steps and a history for each of the steps, and wherein a workflow log of the result identifies at least one of the steps in the map and provides additional information for the identified at least one of the steps.

* * * * *